US006371150B1

(12) United States Patent
Shimada

(10) Patent No.: US 6,371,150 B1
(45) Date of Patent: Apr. 16, 2002

(54) FLOW DIVIDING VALVE

(75) Inventor: Yoshiyuki Shimada, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/514,350

(22) Filed: Feb. 28, 2000

(30) Foreign Application Priority Data

Aug. 4, 1998 (JP) .......................................... 10-219503

(51) Int. Cl.[7] ................................................ G05D 11/00

(52) U.S. Cl. ............................. 137/119.03; 137/119.01; 137/119.08

(58) Field of Search ....................... 137/119.01, 119.08, 137/119.03

(56) References Cited

U.S. PATENT DOCUMENTS

| | | | | |
|---|---|---|---|---|
| 2,868,217 A | * 1/1959 | Faisandier | 137/119.03 |
| 3,730,206 A | * 5/1973 | Sirek | 137/119.08 |
| 3,788,339 A | * 1/1974 | Denker | 137/115.26 |
| 4,216,702 A | * 8/1980 | Brundidge et al. | 91/436 |
| 4,285,268 A | * 8/1981 | Deckler | 91/517 |
| 4,616,671 A | * 10/1986 | Steinkuhl et al. | 137/101 |
| 4,712,649 A | * 12/1987 | Saam | 184/7.4 |
| 4,921,072 A | * 5/1990 | Divisi | 184/7.4 |
| 5,509,391 A | * 4/1996 | DeGroot | 123/467 |

FOREIGN PATENT DOCUMENTS

| | | |
|---|---|---|
| JP | 54-74523 | 6/1979 |
| JP | 63-139302 | 9/1988 |
| JP | 5-44704 | 2/1993 |

OTHER PUBLICATIONS

English Abstract of JP 63–139302.

* cited by examiner

*Primary Examiner*—A. Michael Chambers
(74) *Attorney, Agent, or Firm*—Millen, White, Zelano & Branigan, P.C.

(57) ABSTRACT

There is provided a flow dividing valve capable of instantaneously and continuously setting the ratio of flow rates for dividing the fluid in an inlet port into a plurality of outlet ports.

The flow dividing valve comprises a flow rate control spool for dividing a flow rate of the fluid in said inlet port into a predetermined ratio of flow rates, and a flow rate ratio-setting spool for setting said ratio of flow rates to control said flow rate control spool, said flow rate ratio-setting spool being operated by a control signal from an external unit.

8 Claims, 2 Drawing Sheets

FLOW DIVIDING VALVE

CROSS REFERENCE TO RELATED APPLICATION

The present invention claims benefit of 35 U.S.C. §120 and a continuation of PCT/TP99/03303 Jun. 22, 1999.

TECHNICAL FIELD

The present invention relates to a flow dividing valve. More specifically, the invention relates to a flow dividing valve capable of freely setting the ratio of flow rates for dividing the fluid in an inlet port into a plurality of outlet ports.

BACKGROUND ART

A flow dividing valve is capable of dividing the fluid in an inlet port into a plurality of outlet ports at a predetermined ratio of flow rates irrespective of the pressures in the outlet ports. This enables, accordingly, a stable flow rate to be fed to the hydraulic actuators in a plurality of systems by using a single oil hydraulic pump, making it possible to simplify the circuit and to decrease the cost of the apparatus. This flow dividing valve is used for actuating an operation apparatus equipped with hydraulic actuators and for actuating an attachment fitted to the operation apparatus in, for example, a construction machine by the fluid discharged from a single hydraulic pump.

With reference to FIG. 3, the flow dividing valve generally designated at a numeral 20 includes a flow rate control spool 24 inserted in a valve body 22, and a needle 26 provided in a flow passage communicated with an inlet port P of the valve body 22 to form a throttle. The flow rate control spool 24 is inserted in a spool slide hole 22a formed in the valve body 22 to freely slide therein, and is pushed, by a compression spring 25 arranged on one end side (left end side in FIG. 3) of the low rate control spool 24, against the side of the other end thereof. The spool slide hole 22*a* communicates with the inlet port P, an outlet port A and an outlet port B. Part of the fluid in the inlet port P flows into the outlet port B through the needle 26 and the flow rate control spool 24, and the remainder thereof flows into the outlet port A through the flow rate control spool 24. Due to the throttle effect, there is produced a pressure difference between the upstream side of the needle 26 and the downstream side thereof. The pressure on the downstream side is guided to an end where the compression spring 25 of the flow rate control spool 24 is arranged, and the pressure on the upstream side is guided to the other end of the flow rate control spool 24. The needle 26 is attached to the valve body 22 via its external thread 26*a*. The extent (opening degree) of the throttle is controlled by adjusting the screw-in amount of the needle 26. The needle 26 that has been adjusted for its screw-in amount is secured by a lock nut 26*b*.

The flow rate control spool 24 slides in the spool slide hole 22*a* due to a pressure difference between the upstream side and the downstream side, which is determined by the opening degree of the needle 26, whereby the openings to the outlet port A and to the outlet port B are adjusted and accordingly, the flow is adjusted and divided. When the pressures change in the outlet port A and in the outlet port B, the flow rates to these ports through the flow rate control spool 24 undergo a change depending on a change in the pressure difference before and after passing through the flow rate control spool 24. Consequently, the flow rate of the fluid flowing into the needle 26 changes to cause a change in the pressure difference between the upstream side and the downstream side of the needle 26. According to this change in the difference in the pressure, the flow rate control spool 24 so slides as to maintain a predetermined ratio of flow rates despite of changes in the pressures in the outlet port A and in the outlet port B. Accordingly, the ratio of flow rates in the outlet port A and in the outlet port B is determined by the throttle opening degree of the needle 26.

DISCLOSURE OF THE INVENTION

The above-mentioned conventional flow dividing valve involves the following problem that must be solved. That is, the ratio of flow rates is manually set by adjusting the opening degree of the needle, making it difficult to instantaneously and arbitrarily accomplish the setting in accordance with the operating amount of the operation lever as desired by an operator. It has therefore been desired to provide a flow dividing valve capable of instantaneously changing the ratio of flow rates.

The present invention has been accomplished in view of the above-mentioned fact, and its technical subject is to provide a flow dividing valve which enables the ratio of flow rates to be instantaneously and continuously set so that the fluid in the inlet port can be divided at a predetermined ratio of flow rates to a plurality of outlet ports.

In order to solve the above-mentioned technical problem according to the present invention, there is provided a flow dividing valve for dividing the fluid in an inlet port into a plurality of outlet ports irrespective of the pressures in the outlet ports, comprising:

- a flow rate control spool for dividing the flow rate of the fluid in said inlet port into a predetermined ratio of flow rates, and
- a flow rate ratio-setting spool for setting said ratio of flow rates to control said flow rate control spool, said flow rate ratio-setting spool being operated by a control signal from an external unit.

The ratio of flow rates is set by operating, by means of a control signal, the flow rate ratio-setting spool that controls the flow rate control spool.

In a preferred embodiment, the ratio of flow rates can be continuously set to an arbitrary value. A pilot hydraulic pressure is used as said control signal. The flow rate ratio-setting spool is provided with a variable throttle that is adjusted by said control signal.

The ratio of flow rates is instantaneously and continuously set to an arbitrary value by the control signal. The ratio of flow rates is instantaneously set in accordance with the magnitude of the pilot hydraulic pressure that is the control signal. Further, the ratio of flow rates is set depending on the throttle opening degree of the variable throttle that is adjusted by the control signal.

BEST MODE FOR CARRYING OUT THE INVENTION

A preferred embodiment of the flow dividing valve constituted according to the present invention will now be described in further detail with reference to the accompanying drawings.

Figure 1:
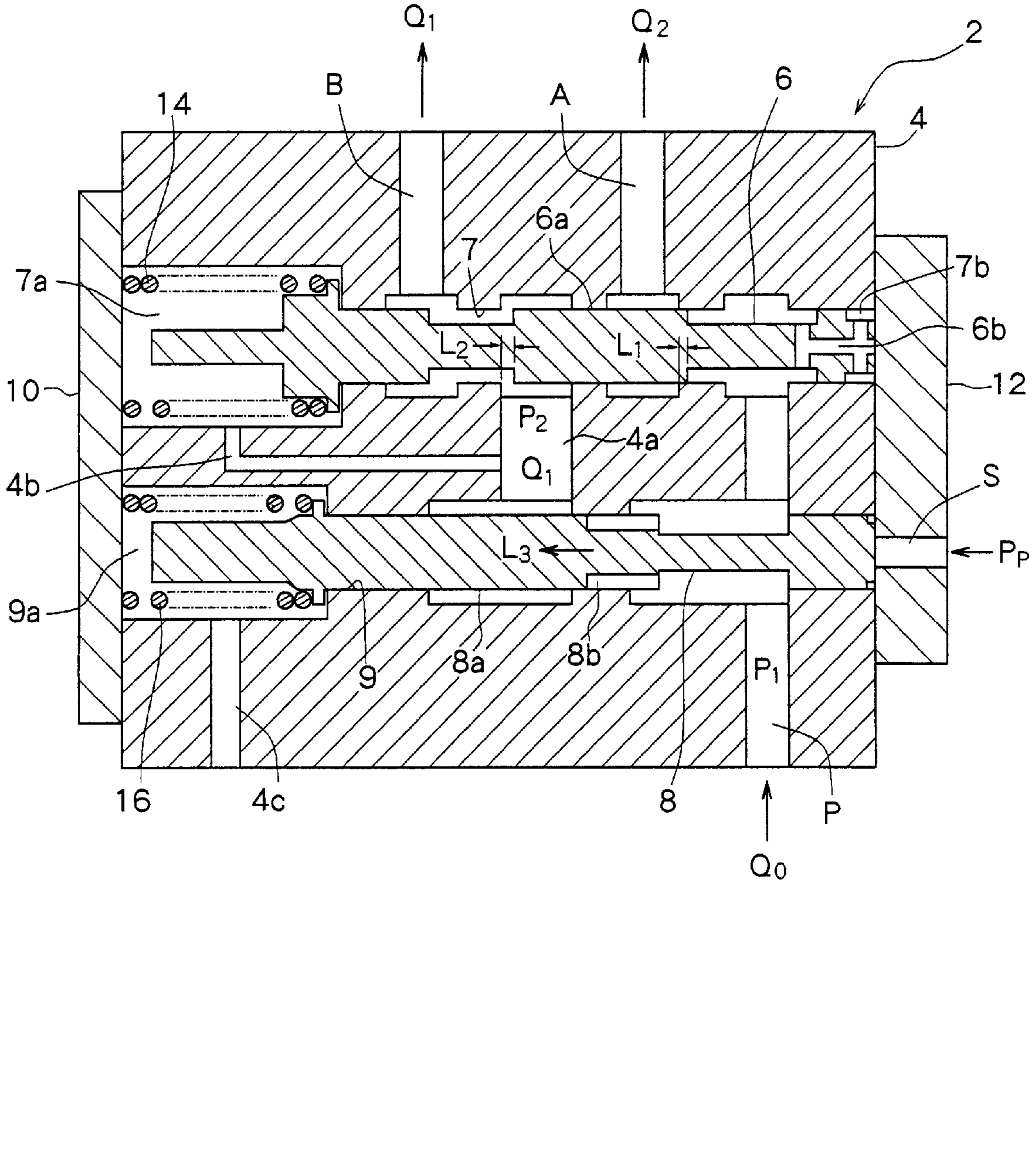
FIG. 1 is a sectional view of a flow dividing valve constituted according to the present invention.

With reference to FIG. 1, the flow dividing valve generally designated at a numeral 2 comprises a valve body 4 that includes a flow rate control spool 6 and a flow rate ratio-setting spool 8.

The valve body 4 has a spool slide hole 7 extending in the axial direction in which the flow rate control spool 6 is inserted to freely slide therein, and a spool slide hole 9 extending in the axial direction in which the flow rate ratio-setting spool 8 is inserted to freely slide therein. The valve body 4 further has an inlet port P communicating with the spool slide hole 7 and with the spool slide hole 9 from the outer side of the valve body 4, and has an outlet port A and an outlet port B communicating with the spool slide hole 7. An end (left end in FIG. 1) of the spool slide hole 7 is provided with a fluid chamber 7*a* having a diameter larger than the spool slide hole 7, and an end (left end in FIG. 1) of the spool slide hole 9 is provided with a fluid chamber 9*a* having a diameter larger than the spool slide hole 9. The spool slide hole 7 and the spool slide hole 9 are connected together through a fluid passage 4*a*. The fluid passage 4*a* is further connected to the fluid chamber 7*a* through a fluid passage 4*b*. The fluid chamber 9*a* is open to the drain via a fluid passage 4*c*.

The respective ends on one side of the spool slide hole 7 and the spool slide hole 9 (on the side of the fluid chamber 7*a* and the fluid chamber 9*a*) are closed by a cover 10 attached to the valve body 4, and the respective ends on the other side thereof are closed by a cover 12 attached to the valve body 4. A signal port S is formed in the cover 12 so as to be communicated with the spool slide hole 9.

The flow rate control spool 6 has a large-diameter land portion 6*a* that is caused to slide to open or close the communication with the outlet ports A and B or to adjust the opening area. The flow rate control spool 6 is positioned being pushed against the cover 12 at the other end of the spool slide hole 7 by a compression spring 14 arranged in the fluid chamber 7*a* at one end of the spool slide hole 7 (in a state shown in FIG. 1). In this state, the large-diameter land portion 6*a* laps (closes) over the outlet port A by a lap length $L_1$. The lap length $L_1$ decreases as the flow rate control spool 6 is slid in a direction to compress the compression spring 14, so that an under lap (open) state is formed. The large-diameter land portion 6*a* is in an under lap (open) state to the outlet port B by a lap length $L_2$. The lap length $L_2$ decreases as the flow rate control spool 6 is slid in a direction to compress the compression spring 14. The lap lengths have a relationship $L_1<L_2$. A fluid passage 6*b* is formed in an end, which comes in contact with the cover 12, of the flow rate control spool 6 to connect a fluid chamber 7*b* formed along the outer periphery of the flow rate control spool 6 to the inlet port P.

Figure 2:
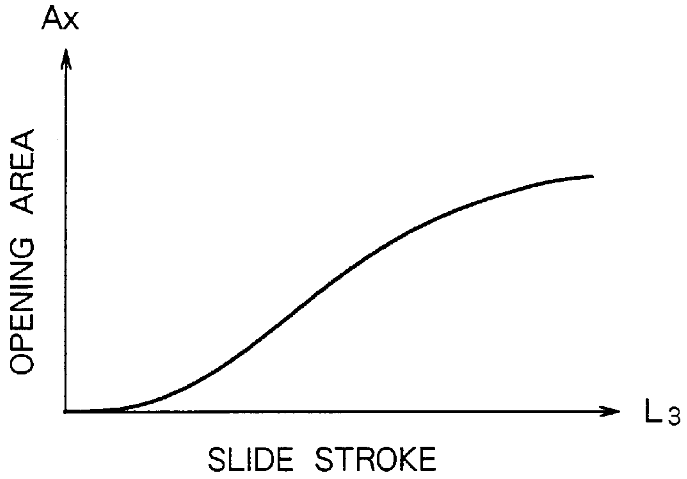
FIG. 2 is a diagram of a characteristic curve showing a variable throttle of a flow rate ratio-setting spool as a relationship between the spool slide stroke and the opening area.
Figure 3:
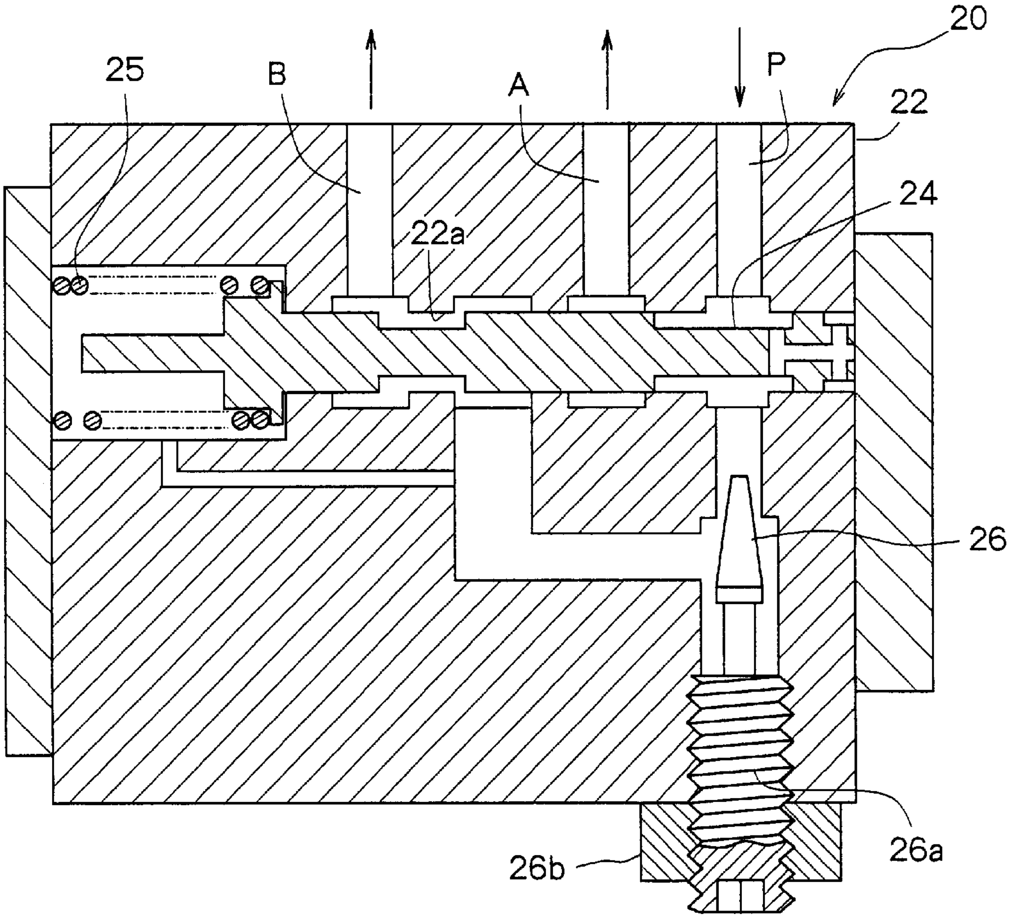
FIG. 3 is a sectional view of a conventional flow dividing valve.

The flow rate ratio-setting spool 8 has a large-diameter land portion 8*a* which is caused to slide to open or close the communication with the fluid passage 4a connected with the outlet port B and the inlet port P or to adjust the opening area, and a plurality of slots 8*b* formed in the large-diameter land portion 8*a*. The flow rate ratio-setting spool 8 is positioned being pushed onto the cover 12 at the other end of the spool slide hole 9 by a compression spring 16 arranged in the fluid chamber 9*a* at one end of the spool slide hole 9 (in a state shown in FIG. 1). In this state, the slots 8*b* in the large-diameter land portion 8*a* do not permit the inlet port P to be communicated with the fluid passage 4*a*. When the flow rate ratio-setting spool 8 is slid in a direction to compress the compression spring 16 (leftward in FIG. 1) by a pilot hydraulic pressure which is a control signal from the signal port S (the control signal will be described later in detail), the slots 8*b* are opened to the fluid passage 4*a* and the opening area increases with the sliding amount. That is, a variable throttle is formed by the slots 8*b*. The variable throttle is so formed that the opening area Ax of the slots 8*b* gradually increases from zero with an increase in the slide stroke L3 of the flow rate ratio-setting spool 8, as shown in FIG. 2.

As the control signal for sliding the flow rate ratio-setting spool 8, a pilot hydraulic pressure Pp is applied from the signal port S. As the pilot hydraulic pressure, a pressurized pressure of a hydraulic pressure source is applied through a pressure-reducing valve (not shown) that is so formed as can be freely operated. The pressure-reducing valve makes output by reducing the pressurized fluid from the hydraulic pressure source so as to elevate a pressure from zero up to a pressure corresponding to the operation amount. There can be used a manually operated pressure-reducing valve or a solenoid operated pressure-reducing valve.

The function of the above-mentioned flow dividing valve 2 will be described with reference to FIG. 1.

The flow rate ratio-setting spool 8 is caused to slide by the pilot hydraulic pressure Pp of the control signal to a position corresponding to the pressure hereof. Here, when the flow rate of the fluid flowing into the input port P at the time when the variable throttle 8*b* is opened to the fluid passage 4*a* is denoted by Q0, the flow rate of the fluid flowing through the variable throttle 8*b* is denoted by $Q_1$, the pressures before and after the variable throttle 8*b* are denoted by $P_1$ and $P_2$, and the opening area of the variable throttle 8*b* is denoted by Ax, there is established the following expression (1), $$Q_1=K\cdot Ax\cdot(P_1-P_2)^{1/2} \quad (1)$$

The pressure $P_2$ is applied, via the fluid passage 4*b*, to the fluid chamber 7*a* in which the spring 14 is disposed at one end of the flow rate control spool 6, and the pressure $P_1$ is applied to the fluid chamber 7*b* at the other end via the fluid passage 6*b* in the flow rate control spool 6. In this case, balance of forces in the axial direction of the flow rate control spool 6 is expressed by the following expression (2), $$S_0\cdot P_2+F=S_0\cdot P_1,\ \text{that is, } F=(P_1-P_2)\cdot S_0 \quad (2)$$

where

F: force of the compression spring 14, $S_0$: sectional area of the flow rate control spool 6.

Here, when the flow rate control spool 6 slides by $L_1$ in the direction to compress the compression spring 14, the following expression (3) holds if the force of the compression spring 14 is denoted by $F_1$.

$$F_1=F_0+k\cdot L_1=\Delta P_1\cdot S_0 \quad (3)$$

where $F_0$: spring force at the time when the flow rate control spool 6 is at a neutral position, k: spring constant of the spring 14, $\Delta P_1$: pressure difference $(P_1-P_2)$ before and after the slots 8*b*.

If the pressure difference is denoted by $\Delta P_2$ at the time when the flow rate control spool 6 slides by $L_2$ in the direction to compress the spring 14, the following expression (4) holds, $$F_0+k\cdot L_2=\Delta P_2\cdot S0 \quad (4)$$

From the expressions (3) and (4), the following expression (5) holds, $$\Delta P_2=k(L_2-L_1)/S_0+\Delta P_1=\text{constant} \quad (5)$$

That is, as the fluid of the flow rate $Q_0$ flows from the input port P into the variable throttle 8*b*, the variable throttle 8*b* opens the moment the pressure difference before and after the variable throttle 8*b* exceeds $\Delta P_0$ according to the expressions (1) to (3), and the fluid flows into the outlet port B.

If the sliding amount in a direction (leftward in FIG. 1) in which the compression spring 14 is compressed by the flow rate control spool 6 is denoted by L, the balance of forces in the axial direction of the flow rate control spool 6 is expressed by the following expression (6) in a state $L_1 \leqq L \leqq L_2$, $$F_0+k\cdot L=(P_1-P_2)\cdot S_0 \quad (6)$$

When the pressure in the output port A is denoted by $P_A$, the pressure in the output port B by $P_B$, and when $P_A \leqq P_B$, the fluid flowing in from the input port P tends to flow much toward the output port A where the pressure is low and, on the other hand, tends to flow less toward the output port B. When the flow rate $Q_1$ decreases, however, $(P_1-P_2)$ decreases according to the expression (1). The flow rate control spool 6, therefore, slides in a direction in which L decreases according to the expression (2), i.e., so as to be balanced at a point close to $L_1$. Accordingly, the flow rate $Q_2$ of the fluid flowing into the output port A is controlled by the flow rate control spool 6.

Contrarily, when $P_A>P_B$, the fluid tends to flow much toward the output port B and tends to flow less toward the output port A. When the flow rate $Q_1$ increases, however, $(P_1-P_2)$ also increases according to the expression (1). The flow rate control spool 6, therefore, slides in a direction in which L increases according to the expression (6), i.e., so as to be balanced at a point close to $L_2$. Accordingly, the flow rate $Q_1$ of the fluid flowing into the output port B is controlled by the flow rate control spool 6.

From the expressions (1), (2), (4) and (5), therefore, the flow rate $Q_1$ of the fluid flowing through the variable throttle 8*b* is expressed by the following expression (7) irrespective of the pressures in the output port A and in the output port B, $$K\cdot A\cdot(\Delta P_1)^{1/2}<Q_1<K\cdot A\cdot(\Delta P_2)^{1/2} \quad (7)$$

That is, the flow rate $Q_1$ of the fluid flowing through the variable throttle 8*b* is maintained constant irrespective of the pressures in the output port A and in the output port B.

By controlling the pilot hydraulic pressure $P_p$ to change the flow rate ratio-setting spool 8, the opening area $A_x$ of the variable throttle 8*b* is continuously changed to freely take out the pressure-compensated flow rate from the output port A and the output port B.

For example, the flow dividing valve of the present invention is used for an attachment circuit for a hydraulic shovel of a construction machine, the output port B is connected to the attachment circuit and the output port A is connected to the circuit of a standard operation apparatus, so that the pressure-compensated fluid is supplied to both circuits at any desired flow rate that is controlled by the pilot pressure Pp irrespective of the pressures in the circuit of the standard operation apparatus and in the attachment circuit, realizing stabilized operation of the actuators.

Though the present invention was described above in detail based on the embodiment, it should be noted that the invention is in no way limited to the above-mentioned embodiment only but can be changed and modified in a variety of ways without departing from the scope of the invention. For example, in the embodiment of the invention, a pilot hydraulic pressure was used as a control signal for operating the flow rate ratio-setting spool, but the flow rate ratio-setting spool may be operated by the output of the solenoid actuated by an electric signal. Further, the embodiment has dealt with two outlet ports (port A and port B), but the number of the output ports is in no way limited to two.

According to the flow dividing valve constituted as contemplated by the present invention, the ratio of flow rates for dividing the fluid in the inlet port into a plurality of output ports, can be set instantaneously and continuously.

What is claimed is:

1. A flow dividing valve for dividing the fluid in an inlet port into a plurality of outlet ports irrespective of the pressures in the outlet ports, comprising:

a flow rate control spool for dividing a flow rate of the fluid in said inlet port into a predetermined ratio of flow rates, and a flow rate ratio-setting spool for setting said ratio of flow rates to control said flow rate control spool, said flow rate ratio-setting spool being operated by a control signal from an external unit.

2. The flow dividing valve according to claim 1 including means to vary said control signal from said external unit so that said ratio of said flow rates can be continuously set to an arbitrary value.

3. The flow dividing valve of claim 2, including means for generating a pilot hydraulic pressure and wherein said pilot hydraulic pressure is used as said control signal.

4. The flow dividing valve of claim 3, wherein said flow-rate ratio-setting spool includes a variable throttle and wherein said variable throttle is adjusted by said control signal.

5. The flow dividing valve of claim 2, wherein said flow-rate ratio-setting spool includes a variable throttle and wherein said variable throttle is adjusted by said control signal.

6. The flow dividing valve of claim 1, wherein said flow-rate ratio-setting spool includes a variable throttle and wherein said variable throttle is adjusted by said control signal.

7. The flow dividing valve of claim 1, including means for generating a pilot hydraulic pressure and wherein said pilot hydraulic pressure is used as said control signal.

8. The flow dividing valve of claim 7, wherein said flow-rate ratio-setting spool includes a variable throttle and wherein said variable throttle is adjusted by said control signal.

* * * * *